United States Patent
Weinrib et al.

(10) Patent No.: US 8,964,877 B2
(45) Date of Patent: Feb. 24, 2015

(54) CHANGING POWER TO FIRST TRANSMISSION SIGNALS UPON DETECTING ISM BAND

(75) Inventors: Uri Weinrib, Lod (IL); Alon Cheifetz, Moshav Yanuv (IL); Schlomit Moisa, Hod Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 281 days.

(21) Appl. No.: 13/527,336

(22) Filed: Jun. 19, 2012

(65) Prior Publication Data

US 2013/0336419 A1 Dec. 19, 2013

(51) Int. Cl.
*H04B 15/00* (2006.01)

(52) U.S. Cl.
USPC ..... 375/285; 455/522; 455/188.2; 455/226.1; 359/337.1; 359/337.2; 359/334

(58) Field of Classification Search
USPC .................................................. 375/285, 256
See application file for complete search history.

(56) References Cited

U.S. PATENT DOCUMENTS

| | | | |
|---|---|---|---|
| 2006/0222061 A1* | 10/2006 | Kojima | 375/219 |
| 2009/0180406 A1* | 7/2009 | Breuer et al. | 370/280 |
| 2010/0062799 A1 | 3/2010 | Ishii et al. | |
| 2011/0002278 A1* | 1/2011 | Lindoff et al. | 370/329 |
| 2011/0312288 A1 | 12/2011 | Fu et al. | |
| 2012/0207038 A1* | 8/2012 | Choi et al. | 370/252 |

* cited by examiner

*Primary Examiner* — Eva Puente
(74) *Attorney, Agent, or Firm* — Lawrence J. Bassuk; Frederick J. Telecky, Jr.

(57) ABSTRACT

A method includes transmitting a first set of transmission signals over an operating frequency band. The method includes detecting if a second set of transmission signals are transmitted adjacent the operating frequency band and reducing power to a subset of the first set of transmission signals when the second set of transmission signals are detected.

8 Claims, 4 Drawing Sheets

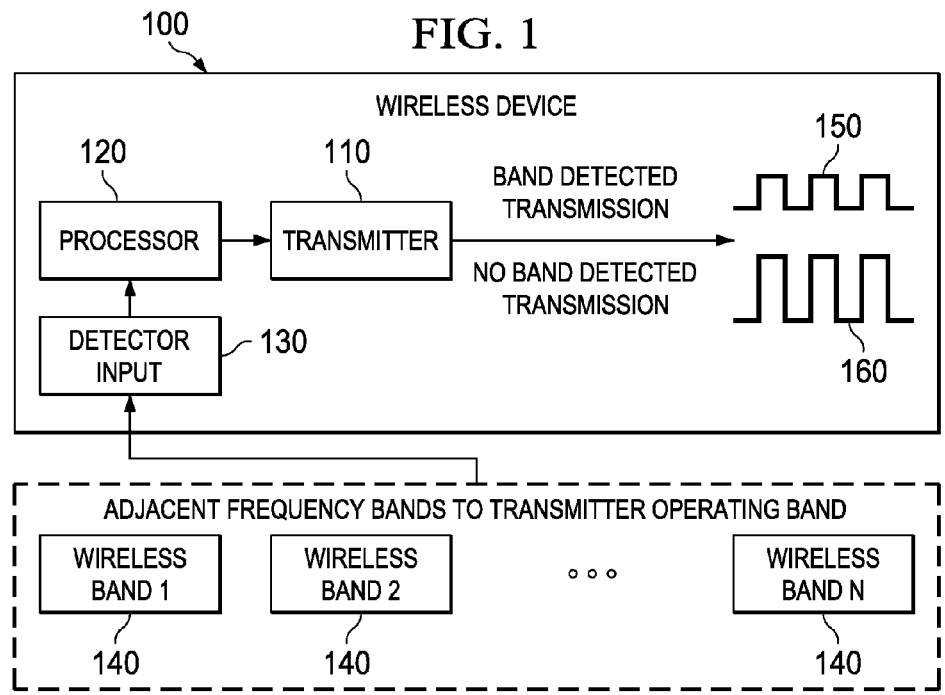
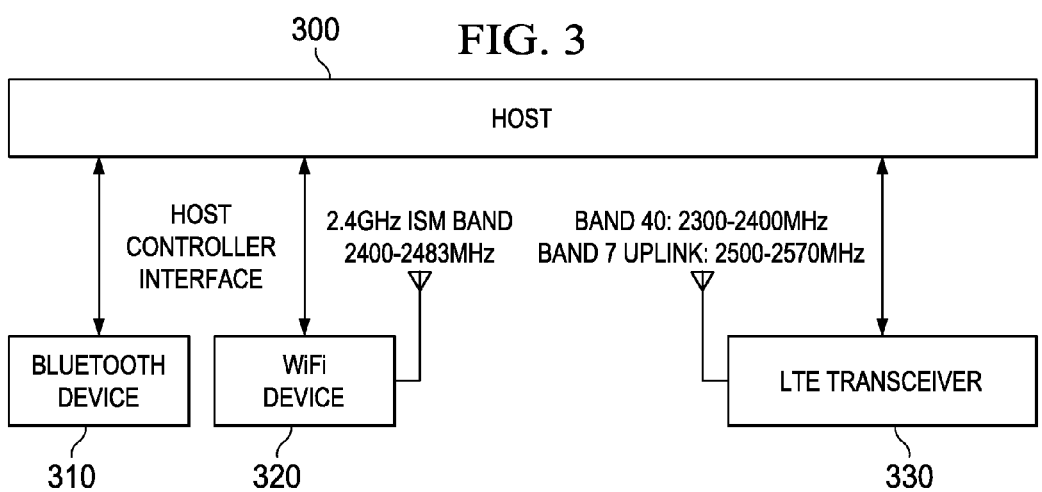

CHANGING POWER TO FIRST TRANSMISSION SIGNALS UPON DETECTING ISM BAND

BACKGROUND

Wireless networks have proliferated in recent years, and in many cases, competing use of available spectrum in the respective networks can occur as additional applications are developed. In one example wireless communications band, the industrial, scientific and medical (ISM) radio bands include radio bands that are reserved internationally for the use of radio frequency (RF) energy for industrial, scientific and medical purposes other than communications. Examples of applications in these bands include radio-frequency process heating, microwave ovens, and medical diathermy machines. Powerful emissions from these devices can create electromagnetic interference and disrupt radio communication of other systems using the same frequency or adjacent frequencies, thus such devices were limited to certain bands of frequencies. In general, communications equipment operating in these bands must tolerate any interference generated by ISM equipment, and thus, users have no regulatory protection from ISM device operation. Despite the intent of the original allocation of bandwidth in the ISM band, in recent years the fastest-growing uses of these bands have been for short-range, low power communications systems. This can include cordless phones, Bluetooth devices and various wireless computer networks utilizing the ISM bands. As use increases on available wireless network bandwidth such as the ISM band, interference among competing devices utilizing such bandwidth can increase. In addition to interference from sources within the ISM band, interference from other licensed bands adjacent to the ISM band, such as eUTRA operating bands 7 and 40 can occur.

SUMMARY

Wireless communications systems and methods are provided that mitigate interference between wireless networks. In one example, a method includes transmitting a first set of transmission signals over an operating frequency band. The method includes detecting if a second set of transmission signals are transmitted adjacent the operating frequency band and reducing power to a subset of the first set of transmission signals when the second set of transmission signals are detected.

In another example, a system includes a processor to send data and a control signal to a transmitter, wherein the control signal includes a command to increase or decrease power to a first set of transmission signals to a transmitter. A detector input can be supplied to the processor to indicate if a second set of transmission signals are transmitted adjacent an operating frequency band of the transmitter, wherein the processor issues the control signal to the transmitter to cause a power reduction to a subset of the first set of transmission signals when the second set of transmission signals are detected.

In yet another example, a device includes a transmitter to generate a first set of transmission signals over an operating frequency band. The device includes a processor to send data and a control signal to the transmitter, wherein the control signal includes a command to increase or decrease power to the transmitter. A detector input supplied to the processor can indicate if a second set of transmission signals are transmitted adjacent the operating frequency band, wherein the processor issues the control signal to the transmitter to cause a power reduction to a subset of the first set of transmission signals when the second set of transmission signals are detected.

BRIEF DESCRIPTION OF THE DRAWINGS

FIG. 1 illustrates an example of a wireless device for mitigating network band interference.

FIGS. 3-5 illustrate example systems for mitigating network band interference.

DETAILED DESCRIPTION

Figure 2:
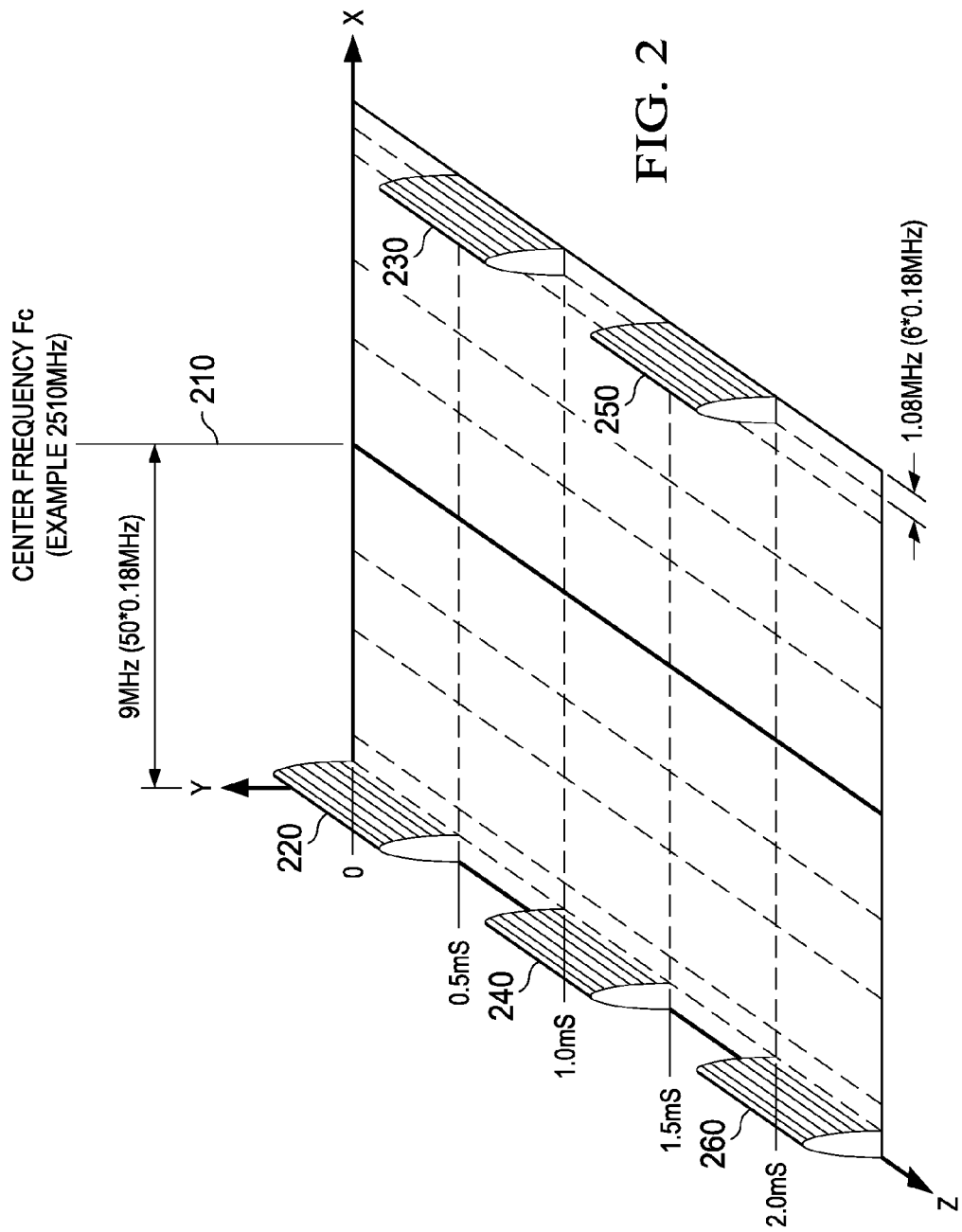
FIG. 2 illustrates an example transmission diagram depicting how power can be selectively reduced to mitigate network band interference.

FIG. 1 illustrates an example of a wireless device 100 for mitigating network band interference. The wireless device 100 can be configured to detect whether or not adjacent networks are operating in vicinity of the device and alter (e.g., reduce power of transmission, disable transmission, disable a portion of a subframe, and so forth) its signal transmission output depending on whether or not the adjacent networks are detected in order to mitigate interference between the networks and the device. The wireless device 100 includes a transmitter 110 to generate a first set of transmission signals over an operating frequency band. For example, the operating frequency band could be related to a 4G network frequency which is described below.

As used herein, the term adjacent frequency refers to a frequency that is close in frequency to the frequency employed by the transmitter 110 (e.g., the detected frequency of the adjacent network is within 40 MHZ of the center frequency of the transmitter operating frequency). Thus, the adjacent frequency can affect the reception of the wireless band receiver performance in wireless band 140 and can be degraded by the transmissions of transmitter 110. For example, when using surface acoustic wave (SAW) filters close by can generate 60 MHz interference while usage of advanced bulk acoustic wave (BAW) filters can reduce the definition of adjacent frequency to 30 MHz.

A processor 120 can be configured to send data and a control signal to the transmitter 110, wherein the control signal includes a command to increase or decrease power to the transmitter 110. A detector input 130 can be supplied to the processor 120 to indicate if a second set of transmission signals are transmitted adjacent the operating frequency band of the transmitter 110. The processor 120 can issue the control signal to the transmitter 110 to cause a power reduction to a subset of the first set of transmission signals when the second set of transmission signals are detected. In this manner, interference can be mitigated between the transmitter 110 operating frequency and the detected adjacent frequencies. In one example, the detector input 130 can also be provided as an input inside the processor 120.

The second set of transmission signals can be associated with one or more wireless bands 140 shown as wireless band 1 through N, with N representing a positive integer. For example, the wireless bands 140 could be associated with a network frequency that is substantially close or adjacent in frequency to the operating frequency of the transmitter 110. If any wireless communications are detected on the wireless band 140 at the detector input 130, then the processor 120 can command the transmitter 110 to adjust its signal transmission output in order to mitigate interference with one or more of the wireless bands 140. As shown, if a band is detected by the detector input 130, a reduced output signal can be generated at 150. If no wireless band is detected at the detector input 130, the processor 120 can command the transmitter 110 to increase its output level to normal or standard operating ranges defined for the transmitter as shown at 160 (e.g., normal output range defined as signal transmission above a predetermined output threshold).

As used herein, the term reducing power can include reducing the signal level of the transmitter 110 or can include disabling a signal or a portion of a signal altogether. For example, if an adjacent wireless band 140 is detected, the subset of the first set of transmission signals to be reduced in power by the transmitter 110 can include an acknowledgement (ACK) signal, for example. The ACK signal could be lowered in amplitude, for example, when an adjacent frequency is detected, or could be disabled for a portion of a frame, wherein a frame can include data, subframes, symbols, resource blocks, and so forth. In one specific example of power reduction at the transmitter 110, the ACK signal can have its power reduced (or disabled) during one half of a subframe as will be shown below with respect to FIG. 2. In addition to reducing signals such as the ACK at the transmitter 110 to mitigate interference with the detected wireless band 140, power can be reduced for data transmissions within the frame, wherein redundant data transmissions can be employed to compensate for the reduced power or disabled data transmissions.

Wireless devices operating within the wireless bands 140 can generate signals which indicate wireless activity. For example, such devices can generate output signals that can be detected by the detector input 130 that indicate wireless data is being received from the second set of transmission signals employed by the wireless band 140. In one specific example for wireless device operation, the first set of transmission signals generated by the transmitter 110 can be transmitted according to a long term evolution (LTE) protocol or transmitted according to a worldwide interoperability for microwave access (WiMAX) protocol which can be supported for 4G operation. In addition, the transmitter 110 can employ a time-division duplex (TDD) protocol or a frequency-division duplex (FDD) protocol to transmit the LTE protocol or the WiMAX protocol, for example. The second set of transmission signals generated by the wireless bands 140 can be transmitted via an industrial, scientific and medical (ISM) band, for example, and may be interfered with by the LTE or WiMAX frequencies employed by the transmitter 110, for example. In some specific examples of adjacent frequency operation for the wireless bands 140, if an ISM band were employed as the wireless band, the respective ISM band could include a wireless local area network protocol (WLAN), a Bluetooth protocol, an IEEE 802.11/WiFi protocol, or an IEEE 802.15.4 ZigBee protocol.

For purposes of simplification of explanation, in the present example, different components of the systems described herein are illustrated and described as performing different functions. However, one of ordinary skill in the art will understand and appreciate that the functions of the described components can be performed by different components, and the functionality of several components can be combined and executed on a single component or be further distributed across more components. For example, the processor 120 and detector input 130 could be integrated on a single device such as an integrated circuit which could also include memory to control the processor. The components described herein can be implemented, for example, as computer executable instructions (e.g., software, firmware), hardware (e.g., CPU, an application specific integrated circuit), or as a combination of both. In other examples, the components could be distributed among remote devices across a network, for example.

Figure 6:
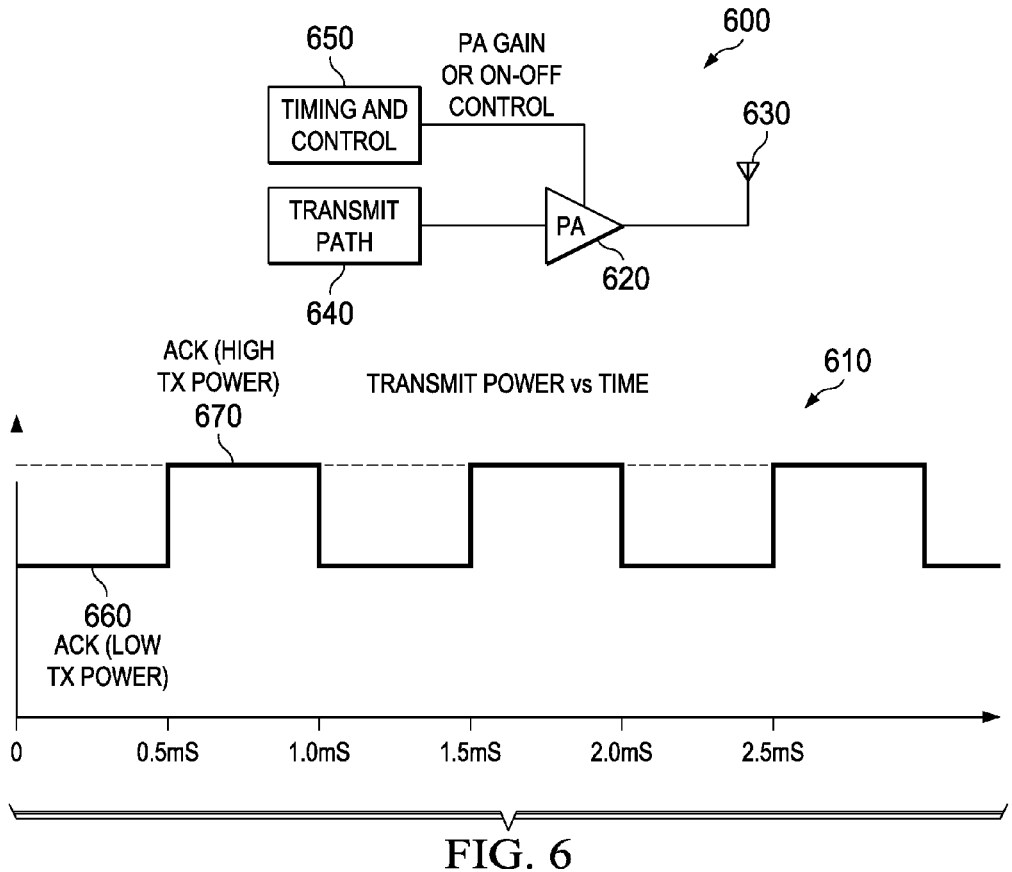
FIG. 6 illustrates an example system to mitigate wireless interference and an example timing and power signal that can be employed by the system.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be stored in memory as machine readable instructions. The machine readable instructions corresponding to the method can also be executed by a processor in a wireless device, such as a cell phone, for example.

FIG. 2 illustrates an example transmission diagram depicting how power can be selectively reduced to mitigate network band interference. The diagram shows an example frequency for a wireless device transmission along an X axis, with a center frequency of 2510 MHz shown at 210. Signal power is depicted along a Y axis, whereas a Z axis denotes time. The diagram represents an example wireless frame having various subframes. At the beginning and end of each subframe, an ACK signal is shown at reference numbers 220 through 260. If an interfering network were detected (e.g., from a device on an ISM band), the ACK signals at 220, 240, and 260 could have their respective power reduced or turned off during the time periods shown. For instance, if an interfering network were detected, the ACK signal shown at 220 could be reduced in amplitude or not transmitted in its entirety during the time period from 0 to 1 ms as shown along the Z axis of the diagram. ACK signals 230 and 250 can be transmitted normally during their half of the subframe when the interfering networks are detected. By reducing or removing ACK (or other signals) during portions of a frame, more frequency separation can be achieved between interfering networks and hence, interference between networks can be reduced.

In one example, Bluetooth and WLAN operate in the 2.4 GHz ISM band (2402 MHz-2483 MHz), whereas LTE (Long Term Evolution) cellular operates in bands adjacent to the ISM band (2300 MHz-2400 MHz and 2500 MHz-2690 MHz). The transmission of each system can cause interference to the other system's reception. The systems and methods described herein mitigate degradation of Bluetooth and WLAN reception performance, for example, when LTE transmits due to the LTE transmitter emission mask acting as an in-band interferer to Bluetooth and WLAN (e.g., LTE emission mask increases the noise level in the ISM band due to its wide transmission bandwidth).

Reducing the emission mask of the LTE transmitter into the ISM band can be achieved by manipulating the LTE transmit signal to transmit its acknowledgments (ACK) on half the transmit bandwidth, thus relying on the high redundancy of the LTE acknowledgment transmission to compensate for the bandwidth reduction without degrading LTE system performance. Since the ACK message can be sent at the edges of the band as depicted in FIG. 2, cutting or reducing the lower part of the band creates a larger frequency separation with interfering networks such as ISM. Thus, the LTE system can transmit the ACK on the edge of the band farthest from the ISM band, for example. This increases the time that Bluetooth and WLAN can receive without being uninterrupted by LTE transmissions and thus, improving overall system performance. As can be appreciated, other technologies than Bluetooth, WLAN, and LTE can be employed with the systems and methods described herein to mitigate interference between wireless networks.

Figure 4:
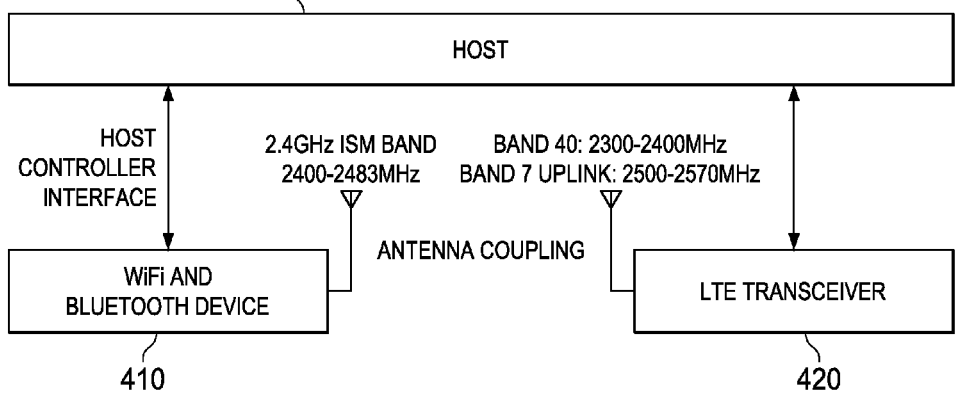
Figure 5:
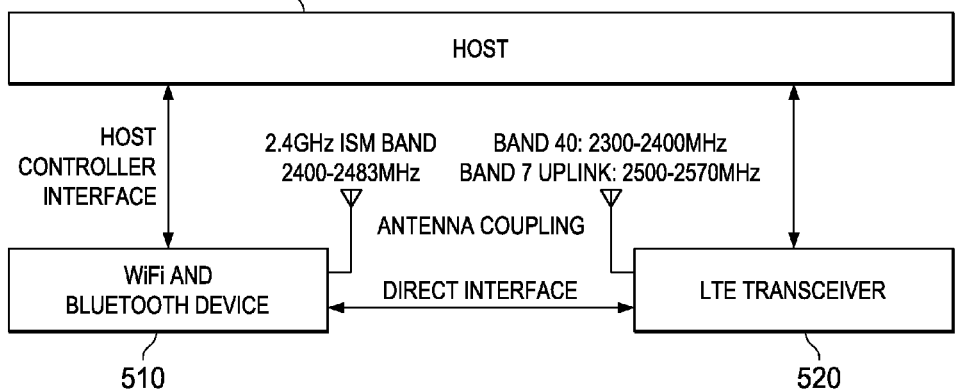

FIGS. 3-5 illustrate example systems for mitigating network band interference. With respect to FIG. 3, a host system 300 (e.g., wireless device having processor, memory, computer executable instructions, input/output for detecting signals and controlling amplifiers, and so forth) receives input from a Bluetooth device 310 and a WiFi device 320, wherein the input indicates whether the device 310 or 320 are receiving data. Such devices could be operative on a 2.4 GHz ISM band operating at 2400-2483 MHz, for example. If wireless activity is detected by the host 300, the host can command an LTE transceiver 330 to reduce its power during portions of its wireless transmission to mitigate interference with the detected Bluetooth device 310 and/or WiFi device 320. The LTE transceiver can operate on band 40 for example having an operating range of 2300-2400 MHz and utilizing a band 7 for uplink having an operating range of 2500-2570, for example.

FIG. 4 illustrates an alternative example where a host 400 receives input from a combined WiFi and Bluetooth device 410. If wireless activity is detected from the combined device 410, an LTE transceiver 420 can reduce or turn off power during portions of its wireless transmissions (e.g., when ACK signals are transmitted) to mitigate interference with the combined device. As can be appreciated, other technologies than Bluetooth, WiFi, and LTE can be employed with the interference mitigation techniques described herein.

FIG. 5 illustrates an alternative example with a host system 500, a combined WiFi and Bluetooth device 510, and LTE transceiver 520. In this example, the combined device 510 communicates via a direct interface with the LTE transceiver 520 and without utilizing the host 510 for communications between the combined device and LTE transceiver, respectively. In a hybrid example, the host could facilitate some communications between the combined device 510 and LTE transceiver 520 while the direct interface could process other communications (e.g., more urgent communications passed via direct interface).

FIG. 6 illustrates an example system 600 to mitigate wireless interference and an example timing and power signal 610 that can be employed by the system. The system 600 includes a power amplifier (PA) 620 that drives an antenna 630. A transmit path 640 feeds data and support structures such as resource blocks to the power amplifier 620 for transmission. A timing and control component 650 can be employed to control the gain of the power amplifier 620 and can also disable the amplifier for all or portions of a transmission. For example, when interfering networks are detected, timing and control component 650 can reduce power to the power amplifier 620 for portions of a TDD or FDD frame in order to mitigate interference with the detected networks.

The timing and power signal 610 shows an example ACK control signal that can be fed to the timing and control component 650. As shown, during a period from 0 to 0.5 ms at 660, ACK power is reduced or disabled. Reduction amounts such as the number of decibels to limit the power amplifier 620 can be a function of frequency separation between interfering networks, available filters, and so forth. Such low power or off period as shown at 660 can be followed by a high power period 670 during time 0.5 ms to 1.0 ms. As shown, the cycle of low and high power for the ACK signal may repeat over time. Other time periods, power levels, and signals other than ACK can be similarly controlled. Also, other duty cycles than 50% shown in the example can be employed.

Figure 7:
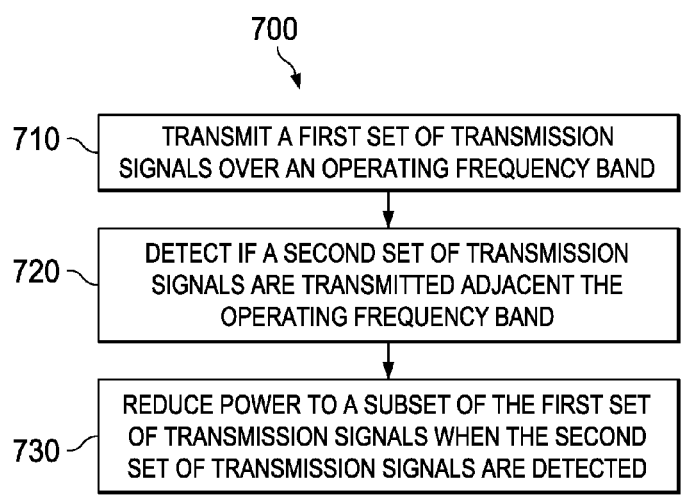
FIG. 7 illustrates an example method for mitigating interference between wireless networks.

FIG. 7 illustrates an example method 700 for mitigating interference between wireless networks. The method 700 includes transmitting a first set of transmission signals over an operating frequency band at 710. Such transmission could be generated by a transmitter such as illustrated at 110 of FIG. 1. At 720, the method 700 includes detecting if a second set of transmission signals are transmitted adjacent the operating frequency band. Such signals may be generated by other wireless bands such as depicted at 140 of FIG. 1. The second set of transmission signals can be detected by a processor input for example. At 730, the method 700 includes reducing power to a subset of the first set of transmission signals when the second set of transmission signals are detected. As used herein, reducing power can include turning off the transmitting of the first set of transmission signals.

Although not shown, the method 700 can also include increasing the power to the subset of the first set of transmission signals when the second set of transmission signals are not detected, wherein the subset of the first set of transmission signals is an acknowledgement (ACK) signal, for example. The method 700 can include reducing the power of the ACK signal or disabling the ACK signal during one half of a subframe such as depicted in the example of FIG. 2. The method 700 can also include reducing the power or disabling the subset of the first set of transmission signals comprising data transmissions, wherein redundant data transmissions are employed to compensate for the reduced power or disabled transmissions.

The detecting of the method 700 can include receiving inputs from wireless devices indicating that data is being received from the second set of transmission signals. The first set of transmission signals can be transmitted according to a long term evolution (LTE) protocol or transmitted according to a worldwide interoperability for microwave access (WiMAX) protocol. This can include employing a time-division duplex (TDD) protocol or a frequency-division duplex (FDD) protocol to transmit the LTE protocol or the WiMAX protocol, for example. The second set of transmission signals can be transmitted via an industrial, scientific and medical (ISM) band, for example. The ISM band can include a wireless local area network protocol (WLAN), a Bluetooth protocol, an IEEE 802.11/WiFI protocol, or an IEEE 802.15.4 ZigBee protocol, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
   transmitting a first set of transmission signals over an operating frequency band, wherein the first set of transmission signals include an acknowledgement (ACK) signal;
   detecting if a second set of transmission signals are transmitted adjacent the operating frequency band, wherein the second set of transmission signals include an industrial, scientific and medical (ISM) band;

reducing power to a subset of the first set of transmission signals when the second set of transmission signals are detected; and increasing power to a subset of the first set of transmission signals when the second set of transmission signals are not detected.

2. The method of claim 1, wherein the reducing power includes turning off the transmitting of the first set of transmission signals.

3. The method of claim 1, including reducing the power of the ACK signal or disabling the ACK signal during one half of a subframe.

4. The method of claim 1, including reducing the power or disabling the subset of the first set of transmission signals comprising data transmissions, wherein redundant data transmissions are employed to compensate for the reduced power or disabled transmissions.

5. The method of claim 1, wherein the detecting includes receiving inputs from wireless devices indicating that data is being received from the second set of transmission signals.

6. The method of claim 1, wherein the first set of transmission signals are transmitted according to a long term evolution (LTE) protocol or transmitted according to a worldwide interoperability for microwave access (WiMAX) protocol.

7. The method of claim 6, including employing a time-division duplex (TDD) protocol or a frequency-division duplex (FDD) protocol to transmit the LTE protocol or the WiMAX protocol.

8. The method of claim 1, wherein the ISM band includes a wireless local area network protocol (WLAN), a Bluetooth protocol, an IEEE 802.11/WiFi protocol, or an IEEE 802.15.4 ZigBee protocol.

* * * * *